Inventor
R. Zürcher

Jan. 16, 1951  R. ZÜRCHER  2,538,142
SHOCK ABSORBING DEVICE FOR BEARINGS
OF HOROLOGICAL MOVERS
Filed Jan. 20, 1945  2 Sheets-Sheet 2
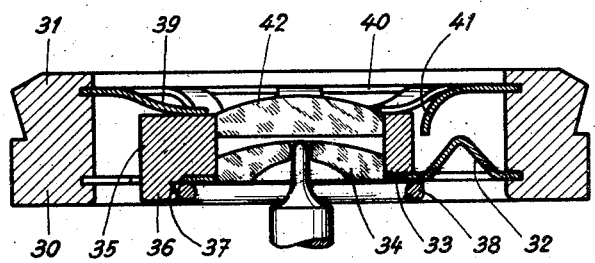
Fig. 6.
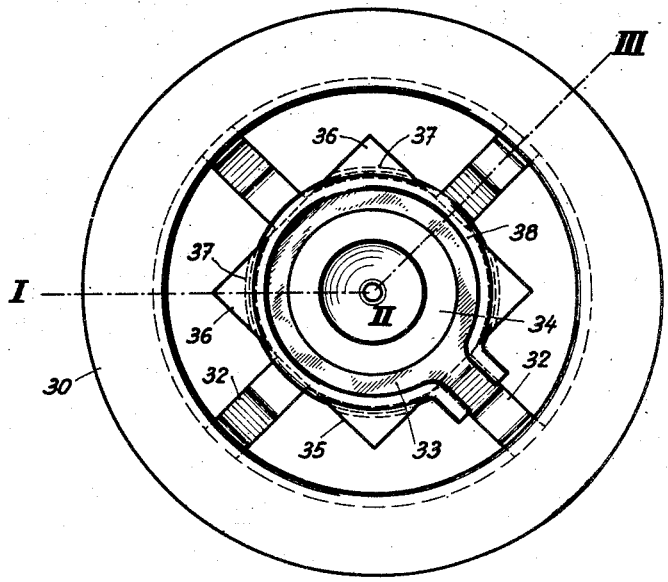
Fig. 7.
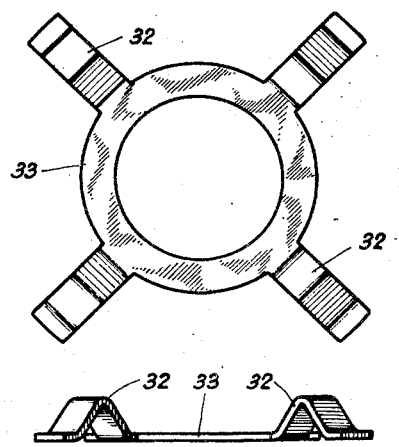
Fig. 8.
Fig. 9.
Inventor
R. Zürcher
By Downing
Attys.

Patented Jan. 16, 1951

2,538,142

UNITED STATES PATENT OFFICE 2,538,142

SHOCK ABSORBING DEVICE FOR BEARINGS OF HOROLOGICAL MOVERS

Roger Zürcher, Les Brenets, Switzerland

Application January 20, 1945, Serial No. 573,777
In Switzerland November 3, 1943

Section 1, Public Law 690, August 8, 1946
Patent expires November 3, 1963

21 Claims. (Cl. 58—140)

This invention relates to shock absorbing devices for bearings of horological movers, in which a pierced jewel is connected with the frame of the movement by means of V-shaped springs radially arranged in a space provided between the jewel and the frame. These V-shaped springs have by preference eyelets by means of which they are screwed, at one end, to the frame, at the other end, to the setting of the pierced jewel. The peaks of the V-shaped springs are generally turned towards the interior of the space between jewel and frame. These springs can be made in one piece with a thin metallic ring, from which they project radially towards the outside. The springs may also be fixed to a central ring, in which the pierced jewel is held. This central ring may support a polygonal setting having feet entering between the V-shaped springs and extending below the central ring. These feet can be notched for receiving a ring fixing the setting to the central ring.

The accompanying drawings illustrate, by way of examples, three embodiments of the shock absorbing device according to the invention.

Fig. 6 is a section along line I—II—III in

Fig. 7 which is a view from below of a third example;

Fig. 8 illustrates V-shaped springs and a ring with which they are made in one piece.

Fig. 9 is a side view of Fig. 8.

Figure 1:
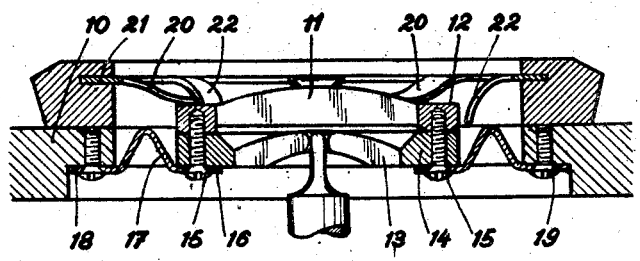
Fig. 1 is an axial section of the first example through the axis of the mover to be protected.

Referring now to Fig. 1, 10 designates the bridge of a mover to be protected. The bearing of this mover comprises a cap-jewel 11 mounted on the setting 12, and a pierced jewel 13 mounted on a setting 14. The whole is arranged so as to form a single block; for this purpose the settings are pressed against each other by means of screws 15 going right through the setting 14 of the pierced jewel 13 and engaging inside threads of the setting 12. The heads of these screws 15 clamp fast the eyelets 16 of V-shaped springs 17, the other ends of which forming likewise eyelets 18 clamped fast by screws 19. All these screws hold the assemblage in exact position in the interior of the hole of the bridge 10, where the bearing to be protected is placed.

Between the outer wall of this bearing and the wall of the hole of the bridge 10 an annular space is provided, into which the peaks of the V-shaped springs penetrate.

Axial shocks to which the bearing is exposed are absorbed by tongues 20 projecting from a ring 21 towards the inside and alternating with other tongues 22 bent downwards and penetrating into the annular space between the bearing and the wall of the hole of the bridge 10. These tongues 22 are not in contact with the bearing. They are, however, at a very small distance from the latter and are destined to receive violent shocks which cannot be absorbed by the V-shaped springs. The device shown works in a manner similar to that of known shock absorbing means. Radial shocks are normally absorbed by the V-shaped springs 17. If these shocks exceed a certain value, the tongues 22 come into effect.

In axial direction, the springs 17, on which the bearing is suspended, enter likewise into action in the case of small shocks. However, as soon as an axial shock exceeds a certain value, it is absorbed by the tongues 20. In such a bearing, the mover protected does never suffer sudden stops, owing to the fact that its staff, under the influence of a shock, does not come into contact with the wall of the hole in the bridge.

Figure 2:
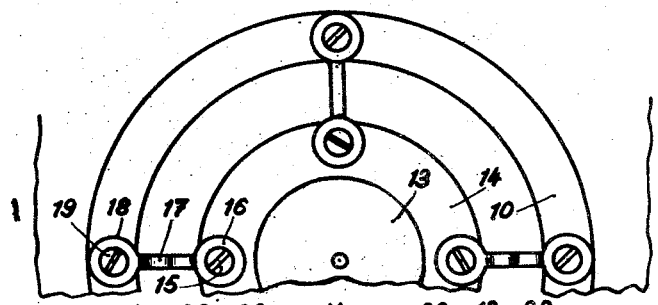
Fig. 2 is a partial view of this example, seen from below.
Figure 3:
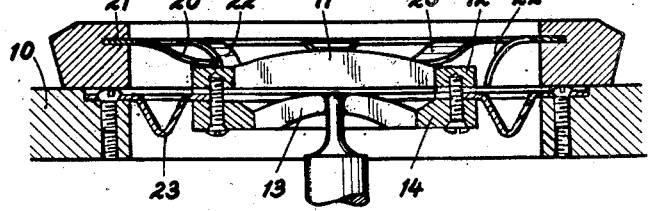
Fig. 3 is a section through a second embodiment.
Figure 4:
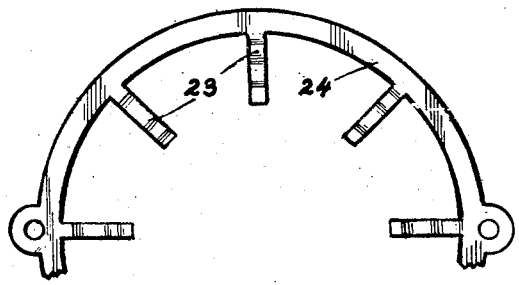
Fig. 4 is a partial view of this second example, seen from below.
Figure 5:
Fig. 5 is a section through Fig. 4.

In Figs. 3, 4 and 5 illustrating the second embodiment, the same letters of reference indicate corresponding parts of Figs. 1 and 2. This shock absorbing device comprises V-shaped springs 23 which are made in one piece with a thin metallic ring 24 from which they extend radially towards the inside. The free ends of the springs are clamped fast between the setting 12 of the cap jewel 11 and the setting 14 of the pierced jewel 13.

Ring 24 is placed on a shoulder provided around the opening of the bridge 10.

In this embodiment springs of the kind designated by 17 in Fig. 2 are lacking, but they might likewise be used. They could alternate with the V-shaped springs 23, so that some of the springs would have peaks turned upwards and others, peaks turned downwards into the annular space between the bearing and the wall of the hole in the bridge 10.

In the example of Figs. 6 to 9 inclusive, 30 designates an outer ring the thickness of which is greater than that of the bridge 10, on which the bearing is mounted. The portion 31, which lies beyond the bridge, serves as index disk. The outer ends of V-shaped springs 32 are set in the ring 30, these springs being made in one piece

ing said central ring, a polygonal setting supported on said central ring and having feet entering between said springs and exceeding said central ring, a cap jewel set in said polygonal setting, a second ring including both first tongues resiliently pressing against said cap jewel and second tongues alternating with said first tongues and forming a crown around said polygonal setting for receiving excesses of shocks not absorbed by said springs.

11. In a horological movement, a pierced member, a mover, a central ring in the hole of and spaced from said pierced member, a pierced jewel set in said central ring and receiving said mover, springs made in one piece with said central ring and arranged in radial direction in the space between said pierced member and said central ring and having a V-shaped section with the V extending in a plane parallel with a plane containing the axis of said mover, said springs being fixed to said pierced member for freely suspending said central ring, a polygonal setting supported on said central ring and having feet entering between said springs and exceeding said central ring and having notches, a split ring entering said notches for fixing said polygonal setting to said central ring, a cap jewel set in said polygonal setting, a third ring including both first tongues resiliently pressing against said cap jewel and second tongues alternating with said first tongues and forming a crown around said polygonal setting for receiving excesses of shocks not absorbed by said springs.

12. In a horological movement, a ring-like outer mounting member, a mover, a central ring in the hole of and spaced from said ring-like mounting member, a pierced jewel set in said central ring and receiving said mover, springs made in one piece with said central ring and arranged in radial direction in the space between said ring-like mounting member and said central ring and having a V-shaped section with the V extending in a plane parallel with a plane containing the axis of said mover, said springs being fixed to said ring-like mounting member for freely suspending said central ring, a polygonal setting supported on said central ring and having feet entering between said springs and exceeding said central ring and having notches, a split ring entering said notches for fixing said polygonal setting to said central ring, a cap jewel set in said polygonal setting, a third ring fixed to said ring-like mounting member, including both first tongues resiliently pressing against said cap jewel and second tongues alternating with said first tongues and forming a crown around said polygonal setting for receiving excesses of shocks not absorbed by said springs.

13. In a horological movement, a bridge, a ring-like outer mounting member set in said bridge and projecting beyond the latter to serve as index disk, a mover, a central ring in the hole of and spaced from said ring-like mounting member, a pierced jewel set in said central ring and receiving said mover, springs made in one piece with said central ring and arranged in radial direction in the space between said ring-like mounting member and said central ring and having a V-shaped section with the V extending in a plane parallel with a plane containing the axis of said mover, said springs being fixed to said ring-like mounting member for freely suspending said central ring, a polygonal setting supported on said central ring and having feet entering between said springs and exceeding said central ring and having notches, a split ring entering said notches for fixing said polygonal setting to said central ring, a cap jewel set in said polygonal setting, a third ring fixed to said ring-like mounting member, including both first tongues resiliently pressing against said cap jewel and second tongues alternating with said first tongues and forming a crown around said polygonal setting for receiving excesses of shocks not absorbed by said springs.

14. In a horological movement, a pierced member, a mover, a pierced-jewel setting in the hole of said pierced member and spaced from the wall of said hole, a pierced jewel set in said pierced-jewel setting and receiving said mover, springs mounted on said pierced member and arranged in radial direction in the space between said pierced member and said pierced-jewel setting and having a V-shaped section with the V extending in a plane parallel with a plane containing the axis of said mover, said V-shaped section lying substantially at the level of said pierced-jewel, a cap-jewel setting, and means holding said springs, said pierced-jewel setting and said cap-jewel setting together to form a set insertable in and removable from the hole of said pierced member.

15. In a watch movement an apertured member, jewel setting means lying within said aperture and transverse with respect to the axis of the aperture, said setting means being spaced from said member, a pierced-jewel set in said setting means, a rotatable member journalled in said pierced-jewel and resilient means extending between and fixed relative to said member and said setting means and including a plurality of radially extending springs of equal resiliency and each including a portion V-shaped in cross-section, the axis of the V being parallel with the axis of said rotatable member and said V-shaped portion having an extent at least equal to the thickness of said pierced-jewel and the position of said V-shaped portion bearing such relationship to the pierced-jewel that spaced transversely extending planes containing the top and bottom surface of the pierced-jewel also contain portions of said V-shaped portion whereby said setting means and said pierced-jewel are freely suspended within the aperture of said aperture member so as to yield radially and vertically in both directions to absorb shocks.

16. In a watch movement as defined in and by claim 15, in which said resilient means comprises a ring and spring tongues projecting radially thereof, said tongues having a portion V-shaped in cross-section.

17. In a watch movement as defined in and by claim 16, in which the apex of said V is adjacent the plane containing the bottom of said pierced-jewel.

18. In a watch movement as defined in and by claim 15, in which said resilient means comprises a ring and spring tongues projecting radially thereof, said tongues having a portion V-shaped in cross-section and in which the apex of said V is adjacent the plane containing the top of said pierced jewel.

19. In a watch movement as defined in and by claim 15 and in which said resilient means comprises separate springs.

20. In a watch movement as defined in and by claim 15, in which said resilient means comprises a ring fixed to said member and integral spring tongues extending inwardly of said ring toward and secured to said setting means.

21. In a watch movement as defined in and by claim 15 in which said resilient means comprises a ring secured to said setting means and integral spring tongues projecting outwardly of said ring and secured to said apertured member.

ROGER ZÜRCHER.

REFERENCES CITED

The following references are of record in the file of this patent:

UNITED STATES PATENTS

| Number | Name | Date |
| --- | --- | --- |
| 82,197 | Bennett, Jr. | Sept. 15, 1868 |
| 294,168 | Ware | Feb. 26, 1884 |
| 894,063 | Salenius | July 21, 1908 |
| 1,114,101 | Boast | Oct. 20, 1914 |
| 1,469,079 | Glenn | Sept. 25, 1923 |

FOREIGN PATENTS

| Number | Country | Date |
| --- | --- | --- |
| 330,925 | Germany | Dec. 24, 1920 |